(12) United States Patent
Moreno Galbis et al.

(10) Patent No.: US 10,591,318 B2
(45) Date of Patent: Mar. 17, 2020

(54) HALF-BRIDGE CIRCUIT FOR A SENSOR (71) Applicant: InvenSense, Inc., San Jose, CA (US)

(72) Inventors: Pablo Moreno Galbis, San Mateo, CA (US); Du Chen, Saratoga, CA (US); Stanley Bo-Ting Wang, Cupertino, CA (US)

(73) Assignee: InvenSense, Inc., San Jose, CA (US)

( * ) Notice: Subject to any disclaimer, the term of this patent is extended or adjusted under 35 U.S.C. 154(b) by 146 days.

(21) Appl. No.: 15/693,107

(22) Filed: Aug. 31, 2017

(65) Prior Publication Data
US 2019/0063957 A1 Feb. 28, 2019

(51) Int. Cl.
G01D 5/24 (2006.01)
G01C 19/5776 (2012.01)
G01P 15/125 (2006.01)
G01P 21/00 (2006.01)

(52) U.S. Cl.
CPC ............ *G01D 5/24* (2013.01); *G01C 19/5776* (2013.01); *G01P 15/125* (2013.01); *G01P 21/00* (2013.01)

(58) Field of Classification Search
CPC .......................... G01R 17/00; G01R 27/2605
See application file for complete search history.

(56) References Cited

U.S. PATENT DOCUMENTS

| 5,511,421 | A | 4/1996 | Kudo |
| 6,747,863 | B2 | 6/2004 | Fasen |
| 7,810,394 | B2 | 10/2010 | Yazdi |
| 7,810,398 | B2 | 10/2010 | Zimmer |
| 8,047,075 | B2 | 11/2011 | Nasiri et al. |
| 9,006,016 | B2 | 4/2015 | Celik-Butler et al. |
| 9,470,647 | B2 | 10/2016 | Gehrig et al. |
| 2001/0013773 | A1 | 8/2001 | Aigner et al. |
| 2007/0163815 | A1* | 7/2007 | Ungaretti ............ G01P 15/125 178/18.06 |
| 2013/0001550 | A1 | 1/2013 | Seeger et al. |
| 2014/0118005 | A1 | 5/2014 | Heinzelmann et al. |
| 2015/0096377 | A1 | 4/2015 | Membretti et al. |

OTHER PUBLICATIONS

Lemkin, et al., "A Three-Axis Micromachined Accelerometer with a CMOS Position-Sense Interface and Digital Offset-Trim Electronics", IEEE Journal of Solid-State Circuits, vol. 34, No. 4, Apr. 1999, 456-468.

* cited by examiner

Primary Examiner — Noam Reisner (57) ABSTRACT

A circuit includes a sensor and a half-bridge circuit. The sensor includes a first sensor capacitor and a second sensor capacitor, where capacitances of the first sensor capacitor and the second sensor capacitor change in opposing directions responsive to receiving a physical signal. The sensor generates a plurality of sensor signals according to the physical signal, the plurality of signals including a common mode injection and a plurality of differential signals. The half-bridge circuit includes a first half-bridge capacitor and a second half-bridge capacitor, where capacitances of the first half-bridge capacitor and the second half-bridge capacitor compensate for the common mode injection of the plurality of sensor signals. The sensor and the half-bridge circuit are coupled to a plurality of sense nodes configured to output the plurality of differential signals.

22 Claims, 7 Drawing Sheets

HALF-BRIDGE CIRCUIT FOR A SENSOR

BACKGROUND

Conventional microelectromechanical (MEMS) sensors include a full capacitive bridge in which pairs of capacitors change their values in opposite direction upon sensing a physical signal. Moreover, MEMS sensors are typically connected to CMOS devices for control. As the MEMS technology advances, it is desirable to minimize the MEMS chip area, as the CMOS chip typically needs to be bigger than the MEMS chip area for bonding purposes. As such, it is desirable to move componentry and functionality off of the MEMS chip into CMOS chip, where possible, to save MEMS chip area. However, moving componentry and functionality off of the MEMS chip into CMOS chip may impact performance of the MEMS sensor.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

The following Description of Embodiments is merely provided by way of example and not of limitation. Furthermore, there is no intention to be bound by any expressed or implied theory presented in the preceding background or brief summary, or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "generating," "compensating," "subtracting," "injecting," "inverting," or the like, refer to the actions and processes of an electronic device such as an electrical circuit.

Overview of Discussion

Discussion begins with a description of an example mobile electronic device with which or upon which various embodiments described herein may be implemented. An example circuit including a MEMS sensor and a half-bridge is then described. Operation of the example circuits are further described in conjunction with description of example methods for using capacitors for compensation of a MEMS sensor.

Example Mobile Electronic Device

Figure 1:
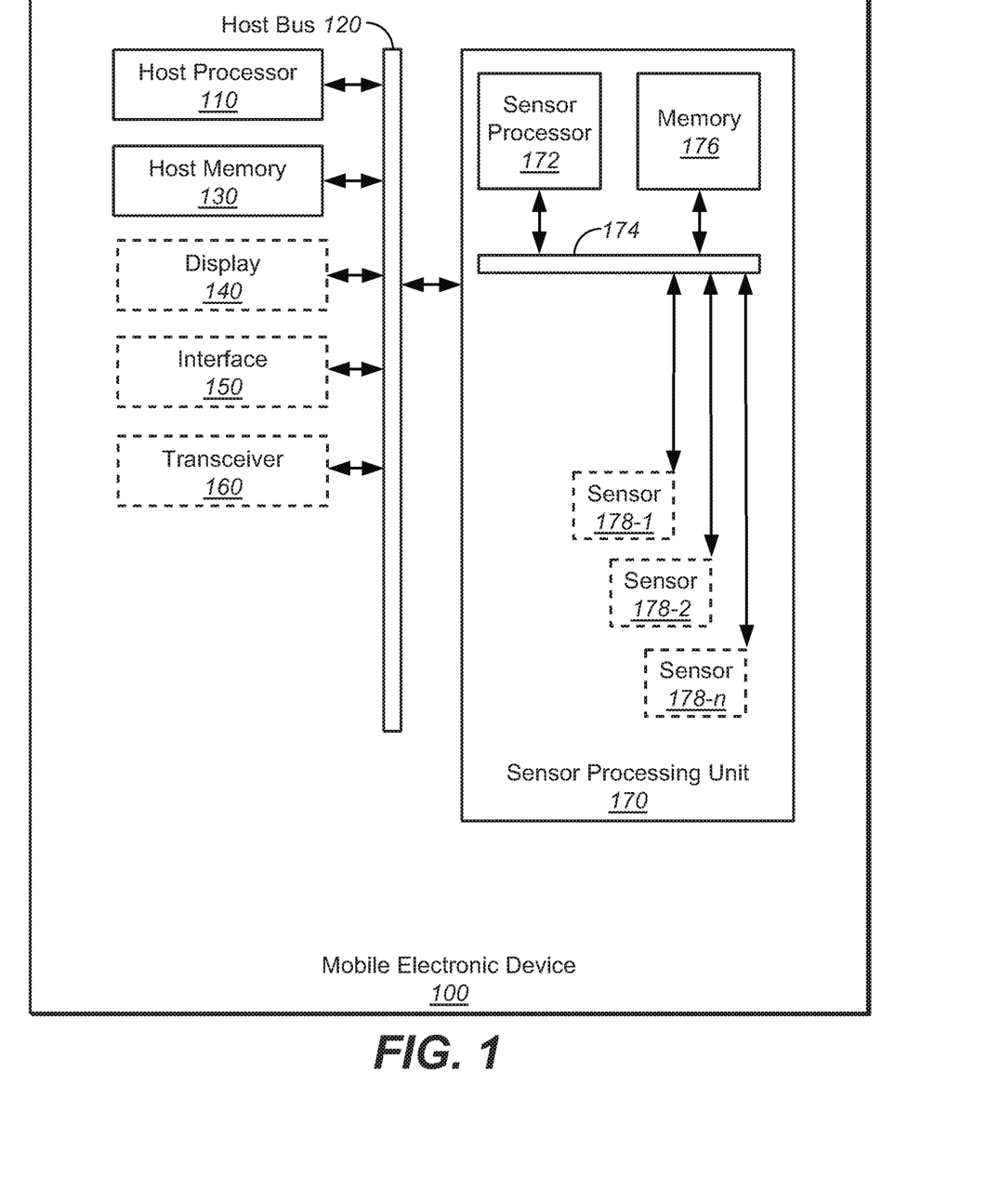
FIG. 1 is a block diagram of an example mobile electronic device upon which embodiments described herein may be implemented.

Turning now to the figures, FIG. 1 is a block diagram of an example mobile electronic device 100. As will be appreciated, mobile electronic device 100 may be implemented as a device or apparatus, such as a handheld mobile electronic device, that can be moved in space by, for example, a human user, a mechanical device, or electrical device. For example, such a mobile electronic device may be, without limitation, a mobile telephone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices.

As depicted in FIG. 1, mobile electronic device 100 may include a host processor 110, a host bus 120, a host memory 130, and a sensor processing unit 170. Some embodiments of mobile electronic device 100 may further include one or more of a display 140, an interface 150, a transceiver 160 (all depicted in dashed lines) and/or other components. In various embodiments, electrical power for mobile electronic device 100 is provided by a mobile power source such as a battery, when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of mobile electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit 170, and other components of mobile electronic device 100 may be coupled communicatively through host bus 120 in order to exchange commands and data. Depending on the architecture, different bus configurations may be employed as desired. For example, additional buses may be used to couple the various components of mobile electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for mobile electronic device 100 to control and manage system resources in real time, enable functions of application software and other layers, and interface application programs with other software and functions of mobile electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at mobile electronic device 100 from an external transmission source and transmission of data from mobile electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Mobile electronic device 100 also includes a general purpose sensor assembly in the form of integrated sensor processing unit (SPU) 170 which includes sensor processor 172, memory 176, at least one sensor 178 (178-1, 178-2, . . . 178-n), and a bus 174 for facilitating communication between these and other components of sensor processing unit 170. In some embodiments, all of the components illustrated in sensor processing unit 170 may be embodied on a single integrated circuit. It should be appreciated that sensor processing unit 170 may be manufactured as a stand-alone unit (e.g., an integrated circuit), that may exist separately from a larger electronic device.

Sensor processor 172 can be one or more microprocessors, CPUs, DSPs, general purpose microprocessors, ASICs, ASIPs, FPGAs or other processors which run software programs, which may be stored in memory 176, associated with the functions of sensor processing unit 170.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, sensor 178, and other components of sensor processing unit 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from one or more sensors 178, as well as the received data either in its raw form or after some processing. Such algorithms and routines may be implemented by sensor processor 172 and/or by logic or processing capabilities included in sensor 178.

A sensor 178 may comprise, without limitation: a temperature sensor, an atmospheric pressure sensor, an infrared sensor, an ultrasonic sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental quantities. In one example, sensor 178-1 may comprise an acoustic sensor, sensor 178-2 may comprise a second acoustic sensor, and sensor 178-*n* may comprise a motion sensor.

In some embodiments, one or more sensors 178 may be implemented using a microelectromechanical system (MEMS) that is integrated with sensor processor 172 and one or more other components of SPU 170 in a single chip or package.

Although depicted as being included within sensor processing unit 170, one, some, or all sensors 178 may be disposed externally to sensor processing unit 170 in various embodiments.

Example Circuit Including a MEMS Sensor and a CMOS Half-Bridge

Figure 2:
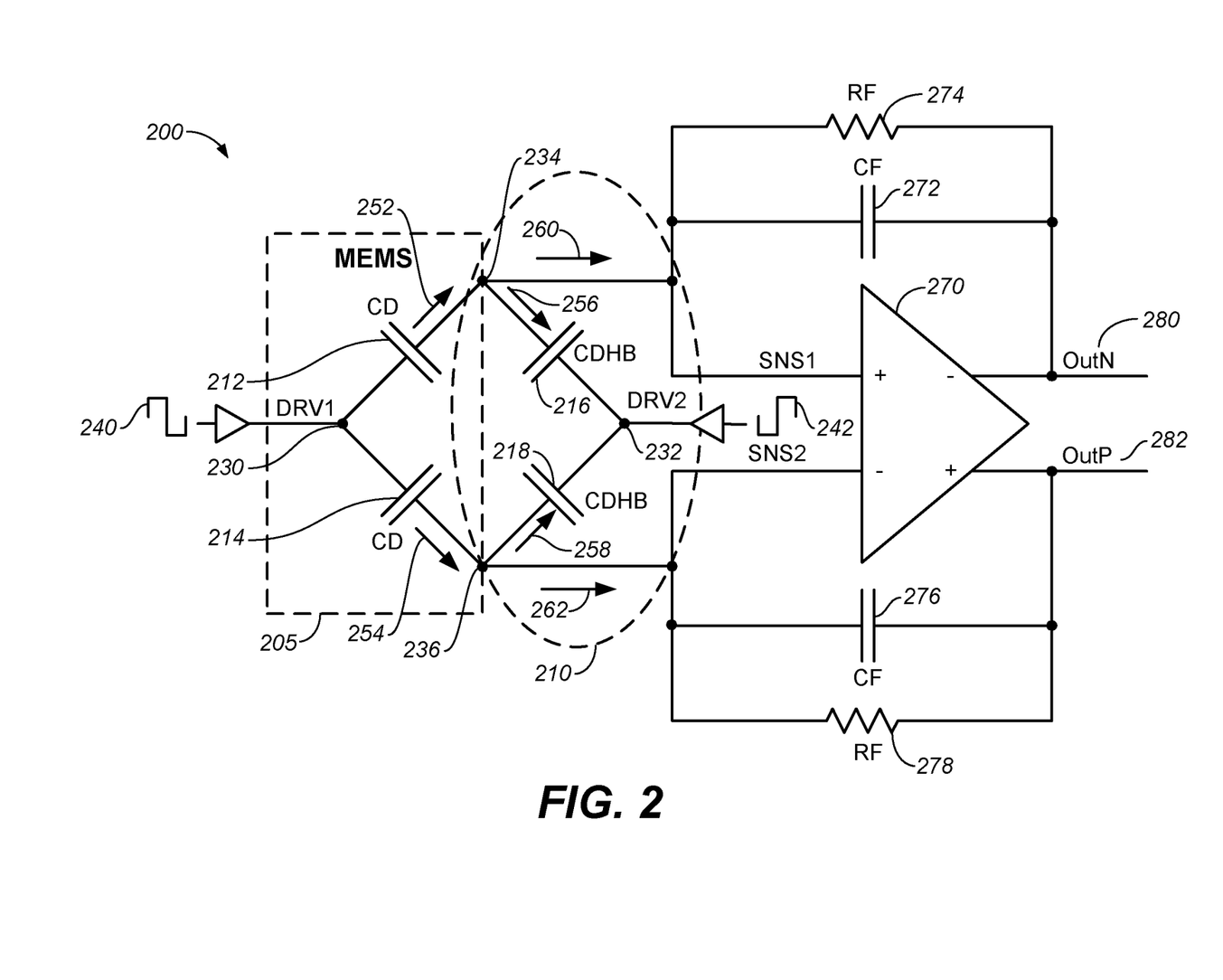
FIG. 2 illustrates a block diagram of an example circuit including a MEMS sensor and a half-bridge, according to some embodiments.

FIG. 2 illustrates a block diagram of an example circuit 200 including a MEMS sensor 205 and a CMOS half-bridge circuit 210, according to some embodiments. For example, sensor processing unit 170 of FIG. 1 may include circuit 200 as a sensor 178 (e.g., sensor 178-1 may be a circuit 200). As illustrated in FIG. 2, circuit 200 includes a MEMS sensor 205 and a CMOS half-bridge circuit 210. While embodiments described herein provide a half-bridge circuit implemented in CMOS, it should be appreciated that other technologies may be used, including, without limitation, gallium arsenide (GaAs), NMOS process, PMOS process, etc.

In various embodiments, MEMS sensor 205 is configured to provide sensing for use in a variety of applications using physical signals. For example, various portable electronic devices, such as those configured to be handheld or otherwise associated with a user, are employed in a wide variety of applications and environments. The ubiquity of devices such as mobile phones, smart phones, and other similar devices indicates the popularity and desire for these types of devices. Increasingly, such devices are equipped with one or more sensors or other systems for determining the position or motion of the portable device, including inertial navigation techniques based upon the integration of specific forces and angular rates as measured by inertial sensors (e.g. accelerometers, gyroscopes).

As shown FIG. 2, circuit 200 includes MEMS sensor 205 and CMOS half-bridge circuit 210. MEMS sensor 205 includes first drive node 230 for receiving drive signal 240 and CMOS half-bridge circuit 210 includes second drive node 232 for receiving drive signal 242. In one embodiment, drive signals 240 and 242 are square-wave voltage signals that operate at a drive frequency. In another embodiment, drive signals 240 and 242 are sinusoidal voltage signals. In one embodiment, drive signals 240 and 242 are in opposite phases (e.g., 180 degrees) such that first drive node 230 and second drive node 232 are driven with opposite phases. For example, drive signals 240 and 242 may originate from a single source signal, where the routing circuitry of one of drive signals 240 and 242 includes an inverter for placing the source signal in the opposite phase.

MEMS sensor 205 includes first MEMS capacitor 212 and second MEMS capacitor 214. MEMS sensor 205 generates MEMS signals 252 and 254 responsive to receiving a physical signal and drive signals 240 and 242, where MEMS signals 252 and 254 includes a common mode injection. CMOS half-bridge circuit 210 includes first CMOS capacitor 216 and second CMOS capacitor 218. The capacitances of first CMOS capacitor 216 and second CMOS capacitor 218 compensate for the common mode injection of the plurality of MEMS signals.

In accordance with various embodiments, the capacitances of first MEMS capacitor 212 and second MEMS capacitor 214 change in response to sensing a physical quantity of the MEMS sensor 205 (e.g., receiving a physical signal). The capacitances of first CMOS capacitor 216 and second CMOS capacitor 218 remain constant for compensating for the common mode injection. In one embodiment, a sum of the capacitances of first MEMS capacitor 212 and second MEMS capacitor 214 is substantially equal (e.g., include no detectable difference for the purposes of sensing a physical quantity at MEMS sensor 205) to a sum of the capacitances of first CMOS capacitor 216 and second CMOS capacitor 218.

Circuit 200 also includes sense nodes 234 and 236, where sense node 234 is coupled to first MEMS capacitor 212 and first CMOS capacitor 216, and where sense node 236 is coupled to second MEMS capacitor 214 and second CMOS capacitor 218.

A physical signal received at MEMS sensor 205 causes capacitances of first MEMS capacitor 212 and second MEMS capacitor 214 to change in opposing directions. For example, responsive to receiving a physical signal, the capacitance of first MEMS capacitor 212 will increase according to a sensitivity and the capacitance of second MEMS capacitor 214 will decrease according to the sensitivity.

MEMS sensor 205 generates MEMS signals 252 and 254 as drive signal 240 is driven through first MEMS capacitor 212 and second MEMS capacitor 214 to sense nodes 234 and 236, respectively. In the event that there is no physical signal changing the capacitances of first MEMS capacitor 212 and second MEMS capacitor 214, MEMS signals 252 and 254 are substantially the same (e.g., include no detectable differential signal for the purposes of sensing any physical quantity at MEMS sensor 205).

Responsive to sensing a physical signal, the capacitances of first MEMS capacitor 212 and second MEMS capacitor 214 change in according to the same magnitude in opposite directions. MEMS signals 252 and 254 that are generated by driving drive signal 240 through first MEMS capacitor 212 and second MEMS capacitor 214 will include a common mode injection and a differential signal, where the differential signal increases one of MEMS signals 252 and 254 and decreases the other of MEMS signals 252 and 254. MEMS signals 252 and 254 are injected into sense nodes 234 and 236, respectively.

CMOS half-bridge circuit 210 generates charges for compensating for the common mode injection of the MEMS signals 252 and 254. The capacitances of first CMOS capacitor 216 and second CMOS capacitor 218 compensate for the common mode injection of the plurality of MEMS signals. Drive signal 242 is driven through first CMOS capacitor 216 and second CMOS capacitor 218 to sense nodes 234 and 236, respectively. Since drive signal 242 is in the opposite phase as drive signal 240, the common mode injection portion is subtracted from MEMS signals 252 and 254 at sense nodes 234 and 236, respectively. The resulting output of sense node 234 is differential signal 260 and the resulting output of sense node 236 is differential signal 262.

In various embodiments, differential signals 260 and 262 are fed into charge to voltage (C2V) amplifier 270, for generating output voltage signals 280 and 282. The difference of output signals 280 and 282 is digitized. In some embodiments, differential signal 260 is also fed into feedback capacitor 272 and feedback resistor 274 in generating output signal 280, and differential signal 262 is also fed into feedback capacitor 276 and feedback resistor 278 in generating output signal 282.

Figure 3:
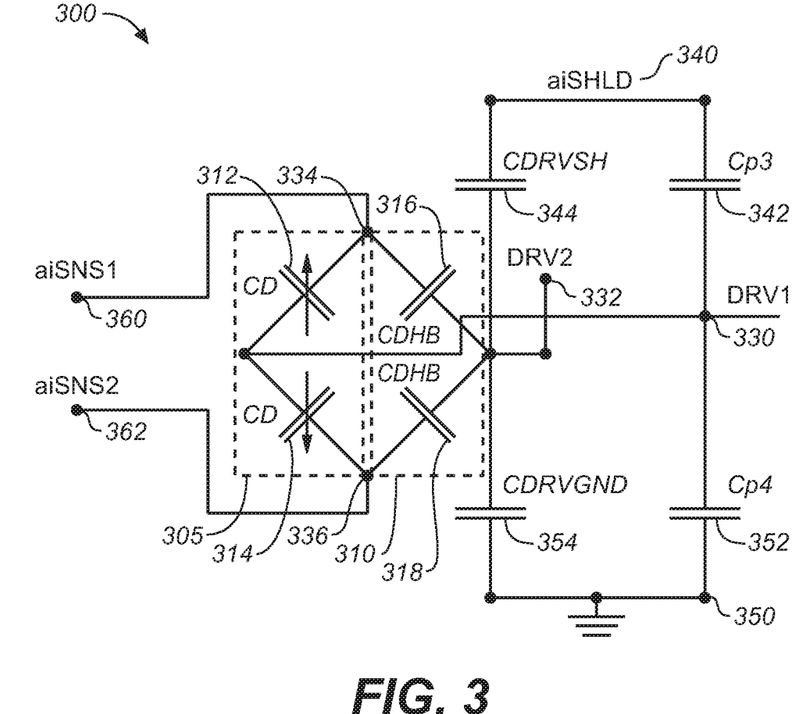
FIG. 3 illustrates a block diagram of an example circuit including a MEMS sensor, a half-bridge, a shield coupling compensation capacitor, and a drive node to ground coupling compensation capacitor, according to some embodiments.

FIG. 3 illustrates a block diagram of an example circuit 300 including a MEMS sensor 305, a CMOS half-bridge circuit 310, a shield coupling compensation capacitor 344, and a drive node to ground coupling compensation capacitor 354, according to some embodiments. For example, sensor processing unit 170 of FIG. 1 may include circuit 300 as a sensor 178 (e.g., sensor 178-1 may be a circuit 300).

As shown FIG. 3, circuit 300 includes MEMS sensor 305 and CMOS half-bridge circuit 310. MEMS sensor 305 includes first MEMS capacitor 312 and second MEMS capacitor 314. MEMS sensor 305 generates MEMS signals responsive to receiving a physical signal, where the MEMS signals include a common mode injection. CMOS half-bridge circuit 310 includes first CMOS capacitor 316 and second CMOS capacitor 318. The capacitances of first CMOS capacitor 316 and second CMOS capacitor 318 compensate for the common mode injection of the plurality of MEMS signals.

In accordance with various embodiments, the capacitances of first MEMS capacitor 312 and second MEMS capacitor 314 change in response to sensing a physical quantity of the MEMS sensor 305 (e.g., receiving a physical signal). The capacitances of first CMOS capacitor 316 and second CMOS capacitor 318 remain constant for compensating for the common mode injection. In one embodiment, a sum of the capacitances of first MEMS capacitor 312 and second MEMS capacitor 314 is substantially equal (e.g., include no detectable difference for the purposes of sensing a physical quantity at MEMS sensor 305) to a sum of the capacitances of first CMOS capacitor 316 and second CMOS capacitor 318.

MEMS sensor 305 includes first drive node 330 for receiving a first drive signal and CMOS half-bridge circuit 310 includes second drive node 332 for receiving a second drive signal. In one embodiment, the first drive signal and the second drive signal are square signals that operate at a drive frequency. In another embodiment, the first drive signal and second drive signal are sinusoidal signals. In one embodiment, the first drive signal and the second drive signal are in opposite phases (e.g., 180 degrees) such that first drive node 330 and second drive node 332 are driven with opposite phases. For example, the first drive signal and the second drive signal may originate from a single source signal, where the routing circuitry of one of the first drive signal and the second drive signal includes an inverter for placing the source signal in the opposite phase.

Circuit 300 also includes sense nodes 334 and 336, where sense node 334 is coupled to first MEMS capacitor 312 and first CMOS capacitor 316, and where sense node 336 is coupled to second MEMS capacitor 314 and second CMOS capacitor 318.

A physical signal received at MEMS sensor 305 causes capacitances of first MEMS capacitor 312 and second MEMS capacitor 314 to change in opposing directions, as illustrated by the arrows in opposite directions. For example, responsive to receiving a physical signal, the capacitance of first MEMS capacitor 312 will increase according to a sensitivity and the capacitance of second MEMS capacitor 314 will decrease according to a sensitivity.

MEMS sensor 305 generates MEMS signals as the first drive signal is driven through first MEMS capacitor 312 and second MEMS capacitor 314 to sense nodes 334 and 336, respectively. In the event that there is no physical signal changing the capacitances of first MEMS capacitor 312 and second MEMS capacitor 314, the MEMS signals are substantially the same (e.g., include no detectable differential signal for the purposes of sensing motion at MEMS sensor 305).

Responsive to sensing a physical signal, the capacitances of first MEMS capacitor 312 and second MEMS capacitor 314 change in according to the same magnitude in opposite directions. The MEMS signals that are generated by driving the first drive signal through first MEMS capacitor 312 and second MEMS capacitor 314 will include a common mode injection and a differential signal, where the differential signal increases one of the MEMS signals and decreases the other of the MEMS signals. The MEMS signals are injected into sense nodes 334 and 336, respectively.

CMOS half-bridge circuit 310 generates charges for compensating for the common mode injection of the MEMS signals. The capacitances of first CMOS capacitor 316 and second CMOS capacitor 318 compensate for the common mode injection of the MEMS signals. The second drive signal is driven through first CMOS capacitor 316 and second CMOS capacitor 318 to sense nodes 334 and 336, respectively. Since the second drive signal is in the opposite phase as the first drive signal, the common mode injection portion is subtracted from the MEMS signals at sense nodes 334 and 336, respectively. The resulting output of sense node 334 is signal 360 and the resulting output of sense node 336 is signal 362. In various embodiments, the differential signals 360 and 362 are fed into a C2V amplifier for generating a sensor output.

In some embodiments, circuit 300 also includes a shield node 340 coupled through a capacitor 342 to first drive node 330 and a shield coupling compensation capacitor 344 coupled to shield node 340 and second drive node 332, where capacitor 342 is implemented in MEMS and shield coupling compensation capacitor 344 is implemented in CMOS. Shield coupling compensation capacitor 344 is for compensating for a charge injection into shield node 340 from first drive node 330.

Shield node 340 is weakly driven (e.g., via a buffer). As the voltage of drive nodes 330 and 332 to change (e.g., go up and down in opposite phases), charge is injected into shield node 340. That charge may introduce a ripple voltage into the voltage that drives shield node 340. Shield coupling compensation capacitor 344 compensates for the charge injected into shield node 340 by subtracting the injected charge from the shield node (e.g., such that ripple voltage is not apparent to the buffer).

In some embodiments, circuit 300 also includes a ground node 350 coupled through a capacitor 352 to first drive node 330 and a drive node to ground coupling compensation capacitor 354 coupled to ground node 350 and second drive node 332, where capacitor 352 is implemented in MEMS and drive node to ground coupling compensation capacitor 354 is implemented in CMOS. Drive node to ground coupling compensation capacitor 354 is for compensating for a difference in slopes of the first drive node and the second drive node.

In various embodiments, capacitor 352 may cause differences in the rise and fall times (e.g., slopes) between the first drive signal at first drive node 330 and the second drive signal at second drive node 332. Drive node to ground coupling compensation capacitor 354 compensates for the difference in slopes between the first drive voltage at first drive node 330 and the second drive voltage at second drive node 332.

Figure 4:
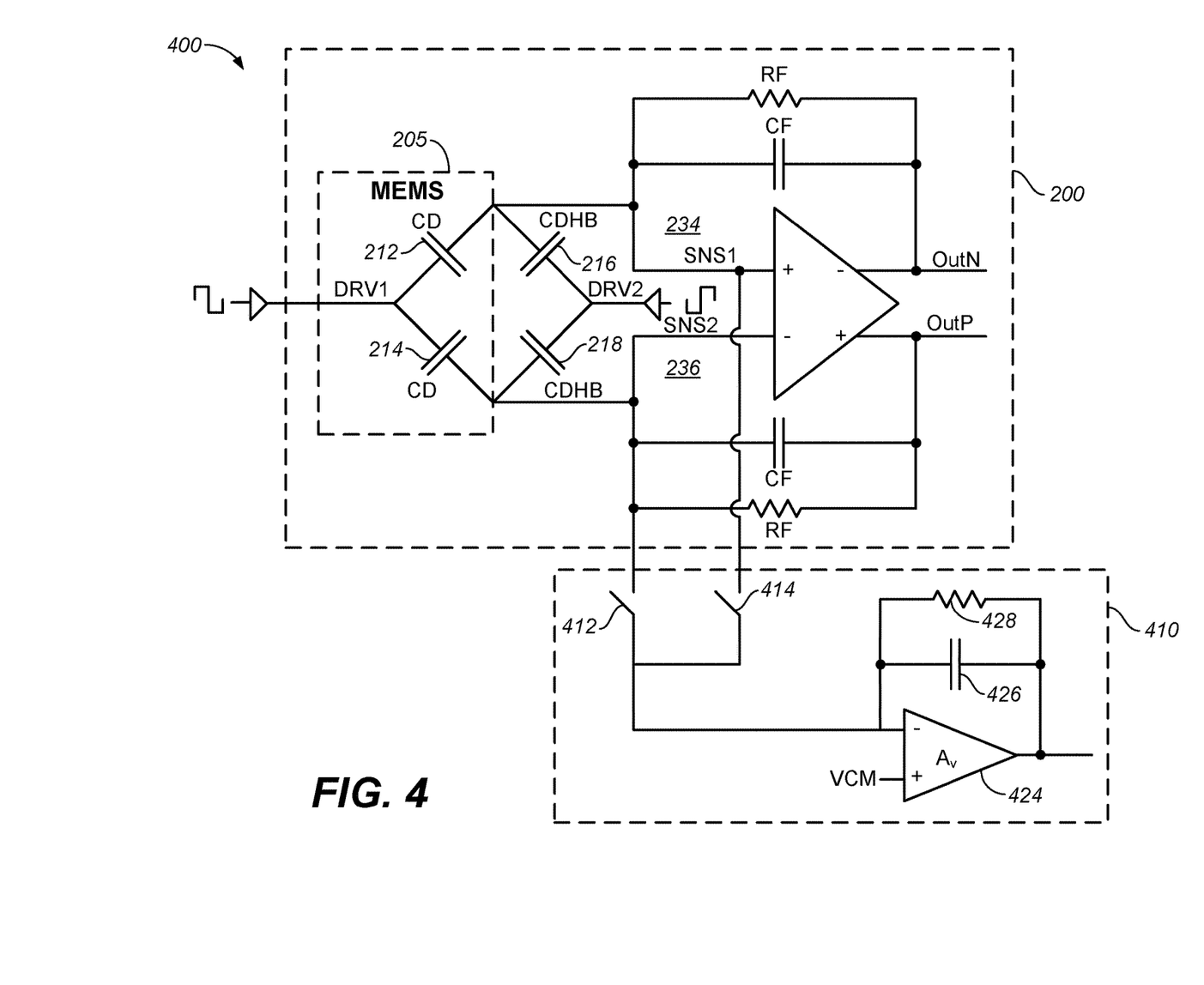
FIG. 4 illustrates a block diagram of an example circuit including a half-bridge trimming circuit, according to some embodiments.
Figure 5:
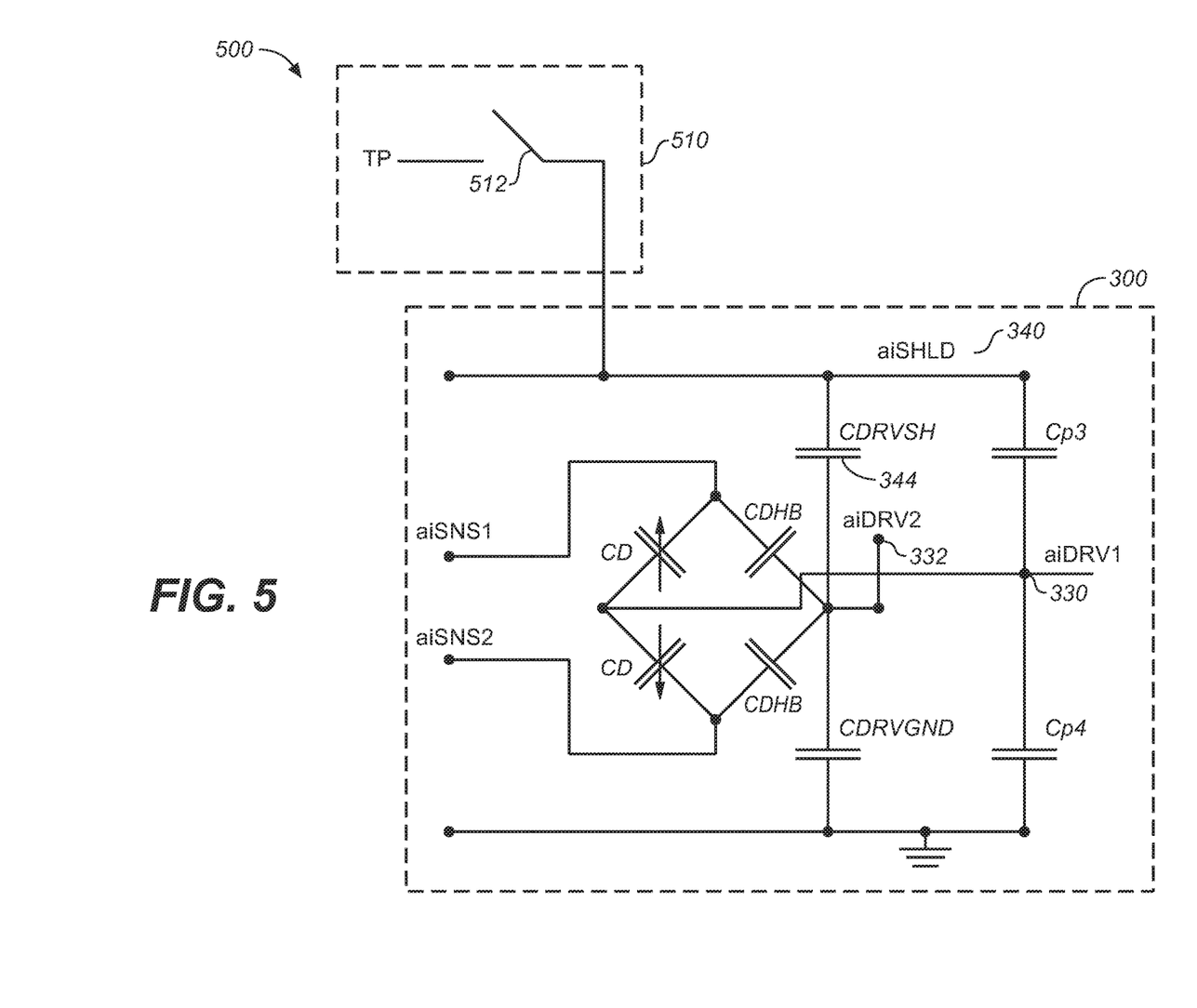
FIG. 5 illustrates a block diagram of an example circuit including a shield drive compensation capacitor trimming circuit, according to some embodiments.
Figure 6:
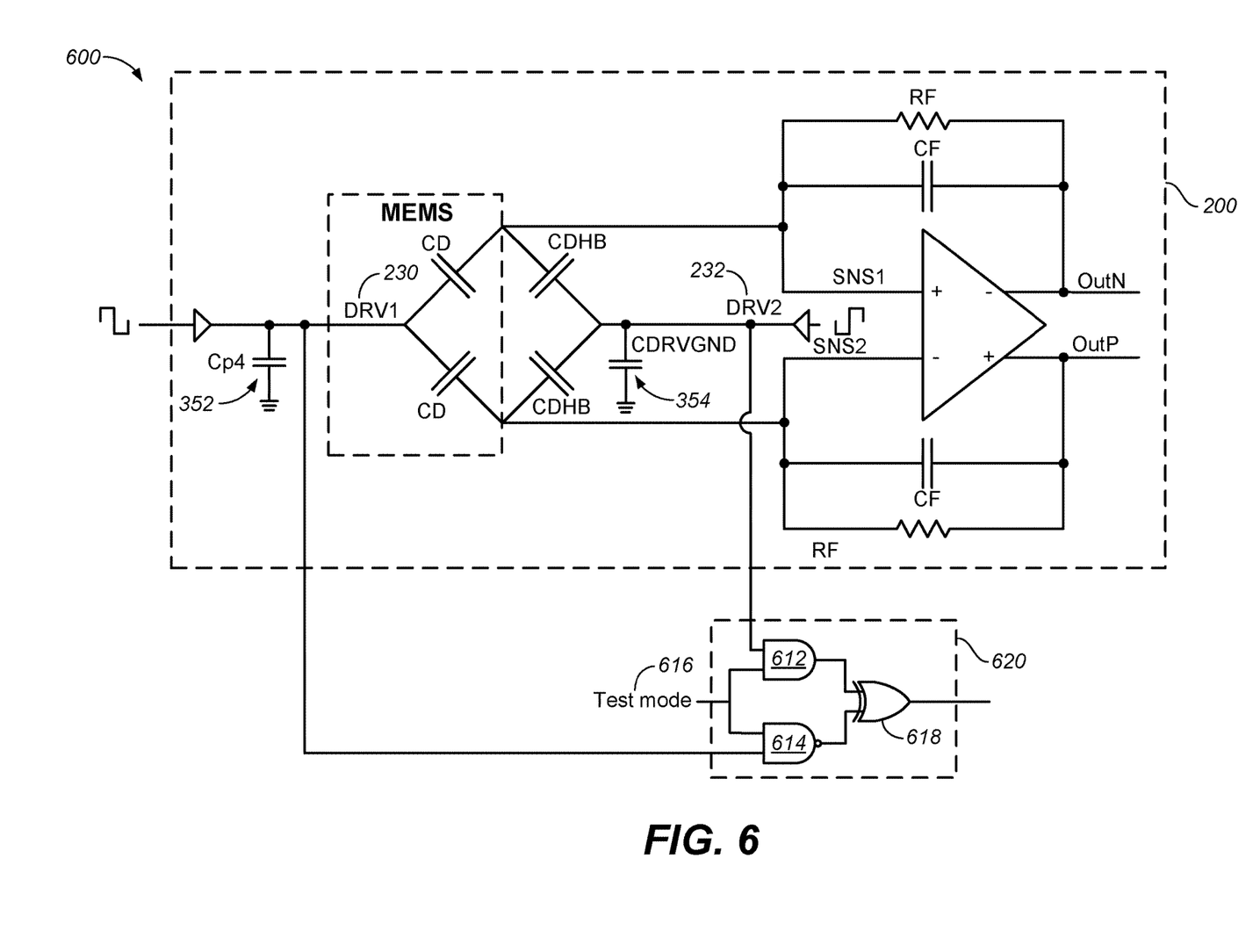
FIG. 6 illustrates a block diagram of an example circuit including a drive node to ground coupling compensation trimming circuit, according to some embodiments.

In accordance with various embodiments, capacitors of a CMOS half-bridge, a shield coupling compensation capacitor, and a drive node to ground coupling compensation capacitor, are described herein. These capacitors are implemented in CMOS. In order to satisfy operational specification, in various embodiments, these CMOS capacitors are trimmed (e.g., at production). In order to trim these capacitors, different signals are measured. FIGS. 4 through 6 illustrate examples of trimming circuits.

FIG. 4 illustrates a block diagram of an example circuit 400 including a CMOS half-bridge trimming circuit 410, according to some embodiments. Circuit 400 includes circuit 200 of FIG. 2, and CMOS half-bridge trimming circuit 410. As described above, in one embodiment, a sum of the capacitances of first MEMS capacitor 212 and second MEMS capacitor 214 is substantially equal (e.g., include no detectable difference for the purposes of sensing motion at MEMS sensor 205) to a sum of the capacitances of first CMOS capacitor 216 and second CMOS capacitor 218.

In order to trim the capacitances of first CMOS capacitor 216 and second CMOS capacitor 218, sense nodes 234 and 236 are shorted together via switches 412 and 414 and connected into a C2V test amplifier 424 (e.g., a sense amplifier). C2V test amplifier 424 receives the shorted outputs of sense nodes 234 and 236 and common mode voltage (VCM), and is configured to determine a difference between the sum of the capacitances of the first CMOS capacitor 216 and second CMOS capacitor 218 and a sum of the capacitances of the first MEMS capacitor 212 and second MEMS capacitor 214 based on the shorted outputs of the plurality of sensing nodes.

In one embodiment the shorted signal is also driven through capacitor 426 and resistor 428. The output of C2V test amplifier 424 is a square wave signal with magnitude proportional to the capacitance mismatch between MEMS sensor 205 and CMOS half-bridge circuit 210 and frequency equal to the drive frequency. This signal is then digitalized. The amplitude of this signal is then measured. The capacitances of first CMOS capacitor 216 and second CMOS capacitor 218 are selected to minimize the value of that signal.

FIG. 5 illustrates a block diagram of an example circuit 500 including a shield drive compensation capacitor trimming circuit 510, according to some embodiments. Due to the coupling from drive nodes 330 and 332, the shield voltage of shield node 340 will have positive and negative disturbances unless the couplings from drive nodes 330 and 332 are matched. In order to trim shield coupling compensation capacitor 344, the shield node voltage is digitalized. The amplitude of ripple is then measured. The capacitance of shield coupling compensation capacitor 344 is chosen to minimize this value.

Shield drive compensation capacitor trimming circuit 510 includes switch 512 for coupling shield node 340 to a test port (TP). This signal is then digitalized. The amplitude of this ripple is then measured (e.g., the peak to peak ripple is measured). In one embodiment, the capacitance of shield coupling compensation capacitor 344 is chosen to minimize ripple.

FIG. 6 illustrates a block diagram of an example circuit 600 including a drive node to ground coupling compensation trimming circuit 620, according to some embodiments. Circuit 600 includes circuit 200 of FIG. 2, and drive node to ground coupling compensation trimming circuit 620. As described in accordance with FIG. 3, drive node to ground coupling compensation capacitor 354 compensates for the difference in slopes between the first drive signal at first drive node 330 and the second drive signal at second drive node 332. In order to match the slopes drive node to ground coupling compensation capacitor 354 needs to match the parasitics to ground.

With reference to FIG. 6, drive nodes 230 and 232 are coupled to ground coupling compensation trimming circuit 620. In one embodiment, ground coupling compensation trimming circuit 620 includes first logic 612 coupled to drive node 232 and a test mode input 616, second logic 614 coupled to drive node 230 and the test mode input 616, and third logic 618 coupled to first logic 612 and second logic 614. In one embodiment, first logic 612 and second logic 614 are AND gates and third logic 618 is an XOR gate. An output of the third logic 618 is a pulse having a width proportional to the difference in slopes on voltages of drive node 230 and drive node 232. The pulse width at the output of third logic 618 is measured. In one embodiment, the output of third logic 618 is digitalized and the pulse width is measured.

In one embodiment, in order to set the capacitance for drive node to ground coupling compensation capacitor 354, in one embodiment, the XOR of one of the drive signals of drive nodes 230 and 232 and the inverse of the other one will create pulses whose duration depends on the mismatch between the two parasitics. Minimizing the length of those pulses allows for matching parasitics in the MEMS sensor 205 and CMOS half-bridge circuit 210.

Example Method for Using CMOS Capacitors for Compensation of a MEMS Sensor

Figure 7:
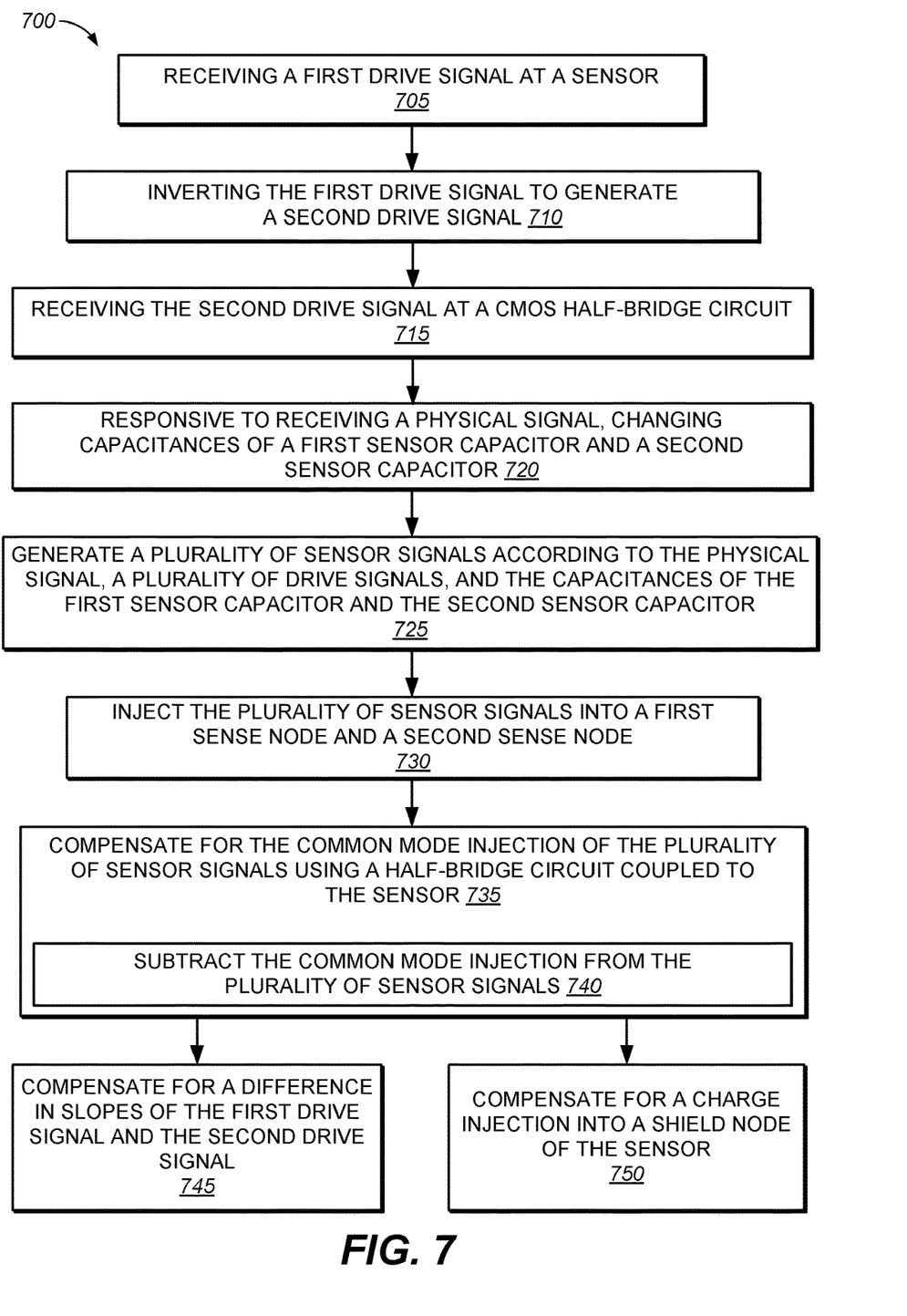
FIG. 7 illustrates a flow diagram of an example method for using capacitors for compensation of a MEMS sensor, in accordance with an embodiment.

FIG. 7 illustrates a flow diagram of an example method for using CMOS capacitors for compensation of a MEMS sensor. For purposes of illustration, during the description of the flow diagram of FIG. 7, reference will be made to elements and/or components of FIGS. 2 and 3. It is appreciated that in some embodiments, the procedures may be performed in a different order than described, that some of the described procedures may not be performed, and/or that one or more additional procedures to those described may be performed. It is further appreciated that one or more procedures described the flow diagram of FIG. 7 may be implemented in hardware, or a combination of hardware with firmware and/or software.

In one embodiment, as shown at procedure 705, a first drive signal (e.g., drive signal 240) is received at a drive node (e.g., drive node 230 or drive node 330) of the MEMS sensor (e.g., MEMS sensor 205 or MEMS sensor 305). In one embodiment, as shown at procedure 710, the first drive signal is inverted by 180 degrees to generate the second drive signal (e.g., drive signal 242). In one embodiment, as shown at procedure 715, the second drive signal is received at a drive node (e.g., drive node 232 or drive node 332) of the MEMS sensor. In one embodiment, the drive nodes are driven with opposite phases.

At procedure 720, responsive to receiving a physical signal at the MEMS sensor, where the MEMS sensor includes a first MEMS capacitor (e.g., first MEMS capacitor 212 or first MEMS capacitor 312) and a second MEMS capacitor (e.g., second MEMS capacitor 214 or second MEMS capacitor 314), capacitances of the first MEMS capacitor and the second MEMS capacitor are changed. The capacitances of the first MEMS capacitor and the second MEMS capacitor change in opposing directions.

At procedure 725, a plurality of MEMS signals are generated at the MEMS sensor according to the physical signal, the drive signals, and the capacitances of the first MEMS capacitor and the second MEMS capacitor. The plurality of MEMS signals includes a common mode injection and a plurality of differential signals.

In one embodiment, as shown at procedure 730, the plurality of MEMS signals are injected into a first sense node (e.g., sense node 234 or sense node 334) and a second sense node (e.g., sense node 236 or sense node 336) of the circuit, where the first MEMS capacitor and the first CMOS capacitor are coupled to the first sense node and the second MEMS capacitor and the second CMOS capacitor are coupled to the second sense node.

At procedure 735, the common mode injection of the plurality of MEMS signals is compensated for using a CMOS half-bridge circuit (e.g., CMOS half-bridge circuit 210 or CMOS half-bridge circuit 310) coupled to the MEMS sensor. The CMOS half-bridge circuit includes a first CMOS capacitor (e.g., first CMOS capacitor 216 or first CMOS capacitor 316) and a second CMOS capacitor (e.g., second CMOS capacitor 218 or second CMOS capacitor 318), wherein capacitances of the first CMOS capacitor and the second CMOS capacitor compensate for the common mode injection of the plurality of MEMS signals. In one embodiment, as shown at procedure 740, the common mode injection is subtracted from the plurality of MEMS signals at a first sense node and a second sense node.

In one embodiment, as shown at procedure 745, a difference in slopes of the first drive signal and the second drive signal is compensated for using a drive node to ground coupling compensation capacitor (e.g., drive node to ground coupling compensation capacitor 354).

In one embodiment, as shown at procedure 750, a charge injection into a shield node of the MEMS sensor by the drive node of the MEMS sensor is compensated for using a shield coupling compensation capacitor of the circuit (e.g., shield coupling compensation capacitor 344).

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A circuit comprising:
   a sensor comprising a first sensor capacitor and a second sensor capacitor, wherein capacitances of the first sensor capacitor and the second sensor capacitor change in opposing directions responsive to receiving a physical signal, the sensor generating a plurality of sensor signals according to the physical signal and a plurality of drive signals, the plurality of sensor signals comprising a common mode injection and a plurality of differential signals;
   a half-bridge circuit coupled to the sensor, the half-bridge circuit comprising a first half-bridge capacitor and a second half-bridge capacitor, wherein capacitances of the first half-bridge capacitor and the second half-bridge capacitor compensate for the common mode injection of the plurality of sensor signals;
   a plurality of sense nodes coupled to the sensor and the half-bridge circuit, the sense nodes configured to output the plurality of differential signals; and
   a half-bridge trimming circuit coupled to the plurality of sense nodes, the half-bridge trimming circuit configured to determine a difference between a sum of the capacitances of the first half-bridge capacitor and the second half-bridge capacitor and a sum of the capacitances of the first sensor capacitor and the second sensor capacitor.

2. The circuit of claim 1, wherein a sum of the capacitances of the first half-bridge capacitor and the second half-bridge capacitor are substantially equal to a sum of the capacitances of the first sensor capacitor and the second sensor capacitor.

3. The circuit of claim 1,
   wherein the capacitances of the first half-bridge capacitor and the second half-bridge capacitor are electronically controlled such that the difference between the sum of the capacitances of the first half-bridge capacitor and the second half-bridge capacitor and the sum of the capacitances of the first sensor capacitor and the second sensor capacitor is substantially zero.

4. The circuit of claim 3, wherein the half-bridge trimming circuit comprises:
   a plurality of switches for shorting outputs of the plurality of sense nodes; and
   a sense amplifier for receiving shorted outputs of the plurality of sense nodes, wherein the sense amplifier is configured to determine a difference between the sum of the capacitances of the first half-bridge capacitor and the second half-bridge capacitor and the sum of the capacitances of the first sensor capacitor and the second sensor capacitor based on the shorted outputs of the plurality of sensing nodes.

5. The circuit of claim 1, further comprising:
   a first drive node for driving a voltage of the first sensor capacitor and the second sensor capacitor; and
   a second drive node for driving a voltage of the first half-bridge capacitor and the second half-bridge capacitor, wherein the first drive node and the second drive node are driven with opposite phases.

6. The circuit of claim 5, further comprising:
   a shield node coupled through a capacitor to the first drive node; and
   a shield coupling compensation capacitor coupled to the shield node and the second drive node, the shield coupling compensation capacitor for compensating a charge injection into the shield node from the first drive node.

7. The circuit of claim 6, further comprising:
   a shield coupling compensation capacitor trimming circuit coupled to the shield node and configured to determine a ripple voltage on the shield node caused by the charge injection, wherein a capacitance of the shield coupling compensation capacitor is electronically controlled such that the ripple voltage on the shield is substantially zero.

8. The circuit of claim 5, further comprising:
   a drive node to ground coupling compensation capacitor for compensating for a difference in voltage slopes of the first drive node and the second drive node.

9. The circuit of claim 8, further comprising:
a drive node to ground coupling compensation capacitor trimming circuit coupled to the first drive node and the second drive node, the drive node to ground coupling compensation capacitor trimming circuit configured to determine the difference in slopes of the first drive node and the second drive node;
wherein a capacitance of the drive node to ground coupling compensation capacitor is electronically controlled such that the difference in slopes of the first drive node and the second drive node is substantially zero.

10. The circuit of claim 9, wherein the drive node to ground coupling compensation capacitor trimming circuit comprises:
a logic circuit coupled to the first and second drive node;
wherein an output of the logic circuit is a pulse having a width proportional to the difference in slopes of the first and second drive nodes.

11. The circuit of claim 10, wherein the logic circuit comprises:
a first logic coupled to the first drive node;
a second logic coupled to the second drive node; and
a third logic coupled to the first logic and the second logic;
wherein the logic circuit is configured for activation responsive to receiving an enable/disable signal.

12. The circuit of claim 1, wherein the sensor is a microelectromechanical (MEMS) sensor.

13. The circuit of claim 1, wherein the half-bridge circuit is implemented in CMOS.

14. A method for compensating for common mode injection of a circuit comprising a sensor, the method comprising:
responsive to receiving a physical signal at the sensor comprising a first sensor capacitor and a second sensor capacitor, changing capacitances of the first sensor capacitor and the second sensor capacitor, wherein the capacitances of the first sensor capacitor and the second sensor capacitor change in opposing directions;
generating a plurality of sensor signals at the sensor according to the physical signal, a plurality of drive signals, and the capacitances of the first sensor capacitor and the second sensor capacitor, the plurality of sensor signals comprising a common mode injection and a plurality of differential signals; and
compensating for the common mode injection of the plurality of sensor signals using a half-bridge circuit coupled to the sensor, the half-bridge circuit comprising a first half-bridge capacitor and a second half-bridge capacitor, wherein capacitances of the first half-bridge capacitor and the second half-bridge capacitor compensate for the common mode injection of the plurality of sensor signals, the compensating comprising:
determining, at a half-bridge trimming circuit, a difference between a sum of the capacitances of the first half-bridge capacitor and the second half-bridge capacitor and a sum of the capacitances of the first sensor capacitor and the second sensor capacitor.

15. The method of claim 14, further comprising:
injecting the plurality of sensor signals into a first sense node and a second sense node of the circuit, wherein the first sensor capacitor and the first half-bridge capacitor are coupled to the first sense node and the second sensor capacitor and the second half-bridge capacitor are coupled to the second sense node.

16. The method of claim 15, wherein the compensating for the common mode injection of the plurality of sensor signals using a half-bridge circuit coupled to the sensor comprises:
subtracting the common mode injection from the plurality of sensor signals at a first sense node and a second sense node.

17. The method of claim 14, further comprising:
receiving a first drive signal of the plurality of drive signals at a drive node of the sensor; and
receiving a second drive signal of the plurality of drive signals at a drive node of a half-bridge circuit.

18. The method of claim 17, further comprising:
inverting the first drive signal by 180 degrees to generate the second drive signal.

19. The method of claim 17, further comprising:
compensating for a difference in slopes of the first drive signal and the second drive signal using a drive node to ground coupling compensation capacitor.

20. The method of claim 17, further comprising:
compensating for a charge injection into a shield node of the sensor by the drive node of the sensor using a shield coupling compensation capacitor of the circuit.

21. The method of claim 14, wherein the sensor is a microelectromechanical (MEMS) sensor.

22. The method of claim 14, wherein the half-bridge circuit is implemented in CMOS.

* * * * *